Oct. 28, 1958   P. L. EPSTEIN ET AL   2,858,457
SYMMETRICAL COMPONENT SENSING SYSTEM
Filed April 29, 1955   2 Sheets-Sheet 1

INVENTORS,
PHILIP L. EPSTEIN
ROBERT L. ARNTZ
BY Woodling and Krost,
attys.

Oct. 28, 1958 P. L. EPSTEIN ET AL 2,858,457
SYMMETRICAL COMPONENT SENSING SYSTEM
Filed April 29, 1955 2 Sheets-Sheet 2

INVENTORS,
PHILIP L. EPSTEIN
BY ROBERT L. ARNTZ
Woodling and Krost,
attys.

United States Patent Office 2,858,457
Patented Oct. 28, 1958

2,858,457

SYMMETRICAL COMPONENT SENSING SYSTEM

Philip L. Epstein and Robert L. Arntz, Mansfield, Ohio, assignors to The Hartman Electrical Manufacturing Company, a corporation of Ohio Application April 29, 1955, Serial No. 504,900

22 Claims. (Cl. 307—127)

The invention relates in general to polyphase or three-phase energization systems wherein control of voltage supply to a load is established by control signals proportional to positive and negative phase sequence voltages.

In aircraft, for example, three-phase, one hundred fifteen volt, four hundred cycle alternating current systems are typical; and in many aircraft systems, both a main and an auxiliary voltage source is provided. The auxiliary source is provided in case some fault should occur on the main three-phase source. Both of these sources may be derived from motor driven generators and it is customary to provide a power relay or contactor to supply a load or load bus normally from the main generator but alternatively from the auxiliary generator should some fault occur on the main voltage source.

There are two general types of faults on three-phase or polyphase systems. One is an undervoltage fault such as caused by a three-phase short or a three-phase open circuit condition. This is a fault which is balanced on all phases. The other common type of fault is an unbalanced fault, unbalanced as to the plural phases such as a short or open on one of the phases.

One prior art method for detecting faults on a polyphase system consists of relays, with one relay connected between each phase of the polyphase supply and neutral. The theory of operation is that if the voltage on any or all phases of the polyphase system should drop due to a balanced or unbalanced fault, one or more of the relays would become de-energized, and thus give indication of fault. This system, however, is not capable of detecting all types of faults. For example, on a three-phase supply, phases "A" and "B" may become short circuited. Ordinarily this will cause the voltage on both phases to drop, and this may be detected by the relays connected to these phases. However, this fault will cause fuses to blow in the supply mains. Assume that the fuse in phase "A" blows. Thereafter, phase "B" will recover normal voltage, and the protective relay in this phase will reclose. The protective relay in phase "A" is now connected to phase "B" by way of the short circuit between "A" and "B," so that it also recloses, thus giving false indication that the system is operating normally, when, in fact, one phase is now open and two phases are shorted together. A further practical difficulty is encountered in obtaining relays with sufficient sensitivity to detect all types of fault. For example, if one phase of a three-phase supply main supplying power to rotating machinery opens up, the voltage on the open phase will be sustained at a value only slightly below normal as a result of the phase-balancer action of the rotating machinery. Relays capable of detecting such small voltage changes have proved to be extremely delicate devices, and their use in aircraft power supply systems where environmental conditions are severe has proven disappointing. The invention hereinafter described is easily capable of sufficient sensitivity to detect this type of fault.

Another prior art system for detecting balanced and unbalanced faults on a polyphase system uses tuned filters, to derive from the system voltages the positive and negative sequence components as encountered in the symmetrical component theory for the analysis of unbalanced polyphase systems. The theory of operation is that in a normal polyphase system, the positive sequence component is equal to the normal line to neutral voltage of the system, while the negative sequence component is zero. A balanced fault will cause a reduction in the positive sequence voltage, while an unbalanced fault will cause an increase in the negative sequence component, thus either type of fault may be detected. It is, in fact, demonstrated in symmetrical component theory that the behavior of electrical machinery connected to an unbalanced polyphase system can be predicted solely on the basis of the symmetrical components of the line voltages, and therefore, a system of fault detection based on these components is theoretically capable of detecting any fault which could possibly affect the behavior of the load. The invention hereinafter described uses the aforementioned principle of symmetrical component fault detection, but avoids certain practical difficulties encountered in prior art systems for applying this principle. Prior art systems have made use of tuned filters to derive from the line voltages of the polyphase system, voltages proportional to the positive and the negative sequence components. However, these tuned filters are sensitive to frequency changes, and in aircraft operation, where the frequency may normally vary from three hundred eighty to four hundred twenty cycles per second, the output of the negative sequence filter in particular may be appreciably in error. A further difficulty of a practical nature encountered in the tuned filters is that of obtaining reactive elements which do not vary in magnitude with temperature changes, which is of particular importance in aircraft power systems where the range in ambient temperature is severe.

The object of the present invention is therefore to provide a control system which is responsive to both positive and negative sequence voltages, which in turn are indicative of balanced and unbalanced faults on a polyphase circuit, without the attendant defects engendered by variable frequency and variable temperature.

Another object of the invention is to provide a rectifier system which produces a voltage proportional to the positive sequence voltage and to provide an additional rectifier system developing a voltage proportional to the negative sequence voltage, each rectifier system producing a control signal and which control signals may be utilized to monitor the supply of power.

Another object of the invention is to provide a positive sequence control voltage and a negative sequence voltage which are either attenuated or amplified so as to be of generally the same order of magnitude for control purposes.

Another object of the invention is to provide time delay means so that transient changes of system voltage do not affect the output signal.

Another object of the invention is to provide a first rectifier network having a direct current voltage output proportional to the positive phase sequence voltage and which also has a small alternating current ripple output proportional to the negative phase sequence voltage and wherein a first control signal is obtained from the rectifier network proportional to the positive phase sequence voltage and also a second control voltage is obtained from the rectifier network proportional to the negative phase sequence voltage.

Another object of the invention is to provide a control signal dependent upon the amount of ripple in the output of a full-wave rectifier, which ripple is proportional to the negative sequence voltage and thus providing indication of unbalanced fault conditions on a polyphase system.

Other objects and a fuller understanding of this invention may be had by referring to the following description and claims, taken in conjunction with the accompanying drawings, in which:

Figure 1:
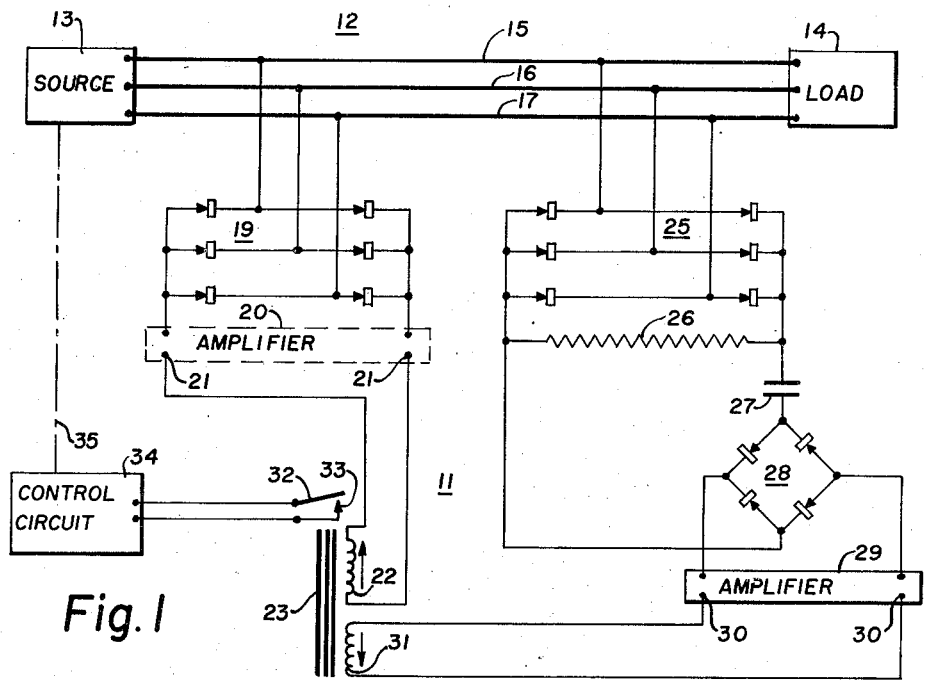
Figure 1 is a schematic diagram of simple control circuit utilizing the invention.

The Figure 1 shows basically a control circuit 11 for use with a polyphase power circuit 12. This polyphase circuit 12 has been shown as a three-phase circuit supplied by a three-phase source 13 and supplying bus bars or conductors 15, 16, and 17, which in turn may supply a load 14. A first full-wave rectifier 19 is connected to be energized from the conductors 15, 16, and 17. This rectifier has six individual rectifiers in a full-wave bridge arrangement and these individual rectifiers may be of the dry plate type or other simple rectifier since they need not be controllable rectifiers. The output of the full-wave rectifier 19 is fed to an amplifier 20 which may be utilized to adjust the magnitude of the output voltage of the rectifier 19. The amplifier 20 has an output at terminals 21 supplied to a control coil 22 on a relay 23.

A second full-wave rectifier 25 is shown as connected to the conductors 15, 16, and 17 for supply of full-wave rectified energy to a load resistor 26. A condenser 27 is connected in series with a bridge rectifier 28 and the series combination is connected across the load resistor 26. The bridge rectifier 28 has an output supplied to an amplifier 29, which in turn has an output at terminals 30 supplied to a second control coil 31 on the relay 23. The relay 23 has normally open contacts 32—33 and these contacts are connected to a control circuit indicated at 34. The control circuit may have a control connection 35 to the voltage source 13.

The operation of the circuit of Figure 1 is such that the control circuit 11 controls the source 13 and in turn controls the energization to the load 14 in accordance with balanced as well as unbalanced faults on the power circuit 12. The full-wave rectifier 19 develops a voltage at the input to the amplifier 20 the direct current component of which is proportional to the positive sequence voltage of the conductors 15, 16, and 17. Since the output of the rectifier 25 is not filtered, there is an alternating current component as well as a direct current component on the resistor 26. This alternating current component will be passed by the condenser 27 to the bridge rectifier 28 where it will be rectified and hence the direct current voltage at the input to the amplifier 29 will be a rectified voltage proportional to the amount of ripple present on the resistor 26, and hence is proportional to the negative sequence voltage of the conductors 15, 16, and 17.

The theory of symmetrical components is very frequently used to calculate fault currents in polyphase circuits. In symmetrical components any polyphase voltage may be broken down into positive phase sequence voltages, negative phase sequence voltages, and zero phase sequence voltages. Under normal balanced conditions, the negative phase sequence voltages are theoretically zero; yet upon an unbalanced fault, the negative phase sequence voltages become very much larger. The rectifier 25, condenser 27 and bridge rectifier 28 provide a means to establish a control proportional to the negative phase sequence voltage. Under an unbalanced fault a much greater ripple voltage is present on the resistor 26 to be passed to and rectified by the rectifier 28. For balanced faults such as balanced shorts or a three-phase open circuit condition, the rectifier 19 will be responsive since the output of this rectifier 19 is proportional to the positive phase sequence voltage. Thus, the positive and negative phase sequence voltages appearing respectively in the outputs of amplifiers 20 and 29 are utilized at the relay 23 to monitor the source 13. Arrows have been placed on the relay control coils 22 and 31 to show that the electromagnetic effects of these two coils are in opposition. If the positive sequence voltage from amplifier 20 decreases, the resultant electromagnetic effect increases in a downward direction to close the contacts 32 and 33. Also, if the negative sequence voltage increases as by an unbalanced fault on the power circuit 12, this will cause the voltage on the control coil 31 to increase in a downward direction so that the resultant electromagnetic effect increases in a downward direction to again close the contacts 32 and 33. Either of these two control conditions thus controls the voltage source. This control might be in the nature of a circuit breaker which opens the connection between the source 13 and the load 14. Therefore, upon either balanced or unbalanced faults, the circuit is broken to protect the circuit 12 and primarily the load 14. Alternatively, the control at 35 may be merely an indicator to indicate a fault condition.

Figure 2:
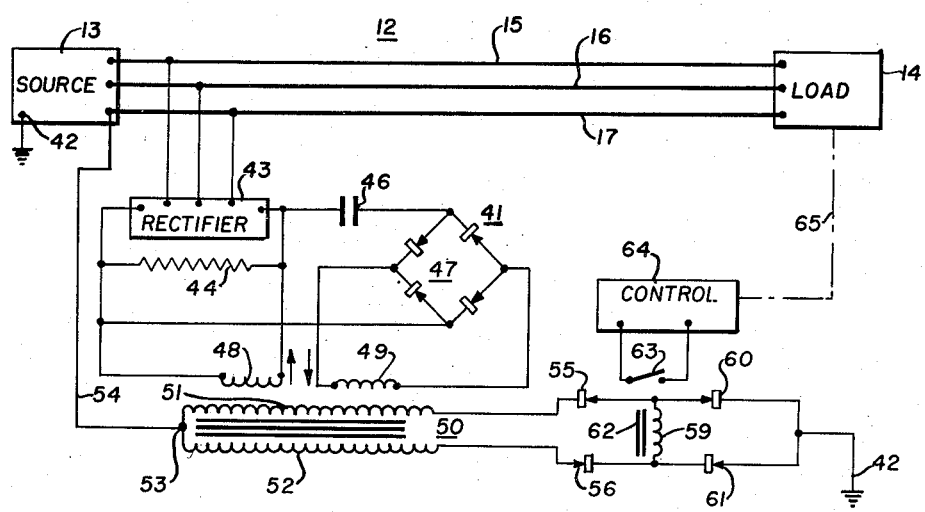
Figure 2 is a schematic diagram of a modified control circuit.

The circuit of Figure 2 shows a slightly modified form of control wherein a control circuit 41 is provided to again control the power circuit 12 including the source 13 supplying the load 14 through the conductors 15, 16, and 17. In this circuit, the source 13 has also been shown as grounded at 42, such as would be typical in a three-phase grounded neutral circuit. A rectifier 43 is again supplied from the conductors 15, 16, and 17, and this rectifier 43 is preferably a full-wave rectifier to develop a rectified voltage on the load resistor 44 which will be proportional to the positive sequence voltage. A condenser 46 and a bridge rectifier 47 are connected in series and connected across the load resistor 44. The output of the load resistor 44 is supplied to a first control coil 48 and the output of the bridge rectifier 47 is supplied to a second control coil 49. The control coils 48 and 49 provide control signals in the control circuit 41 proportional respective to the positive and negative sequence voltage of the conductors 15, 16, and 17. In this circuit of Figure 2, the control coils 48 and 49 are part of a magnetic amplifier 50. This magnetic amplifier has gate windings 51 and 52 connected together at a terminal 53 which is connected by a conductor 54 to the bus bar 17. Rectifiers 55 and 56 are a part of the magnetic amplifier 50 to establish unidirectional current in each of the gate windings 51 and 52. A relay coil 59 is connected in series between the rectifiers 55 and 56, and additional rectifiers 60 and 61 are also connected in series between ground 42 and opposite ends of the relay coil 59. The relay coil 59 is a part of a control relay 62 which has normally open contacts 63 connected to a control circuit 64 in turn connected by a control connection 65 to the load 14.

The operation of the circuit of Figure 2 is basically the same as the operation of the circuit of Figure 1. The rectifier 43 develops a voltage across the load resistor 44 which is a full-wave rectified voltage having a direct current component and having necessarily an alternating current component. The direct current component is proportional to the positive sequence voltage and the alternating current component is proportional to the negative sequence voltage. Since the condenser 46 passes the alternating current component to the bridge rectifier 47 where it is rectified, it will be seen that the control coil 48 has a voltage thereon proportional to the positive sequence voltage; and the control coil 49 has a voltage thereon proportional to the negative sequence voltage. These two control coils 48 and 49 are wound in opposition, as shown, to have opposite effect on the magnetic amplifier 50. The voltage on the control coil 48 is normally larger than that on coil 49, but the turns ratio of these coils is adjusted so that the resultant electromagnetic effects under normal conditions may be considered to be equal and opposite.

Therefore, if a balanced fault occurs on the power circuit 12, the control voltage at coil 48 decreases to increase the resultant electromagnetic control effect to decrease the output from the gate windings 51 and 52 to the relay coil 59, thus de-energizing the relay and opening the contacts 63. Similarly, if an unbalanced fault such as a fault on one or two phases occurs on the power circuit 12, this causes a considerably increased negative sequence voltage signal on the control coil 49 which unbalances the previous equality of effect of the two coils which results in a decrease in the output of the gate windings 51 and 52 to the relay coil 59, which de-energizes the relay coil 59 and opens the contacts 63.

The balanced or unbalanced faults therefore each cause opening of the contacts 63 to control the load 14 by means of the control circuit 64. This control may be in the form of merely an indicator device to indicate the fault or it may be in the form of a circuit breaker to disconnect the load from the source 13 to protect the load or circuit.

In the event that the voltage on the conductor 17 drops to a low value as a result of a fault in the source or the supply mains, the supply of power 54 to the magnetic amplifier 50 is thereby disrupted, and the relay 62 is de-energized, thus initiating control action without the intervention of the positive and negative sequence networks. The device will thus initiate control action or give indication of fault even though its own power supply 54 is disrupted. This makes an auxiliary source of power for the magnetic amplifier unnecessary.

Figure 3:
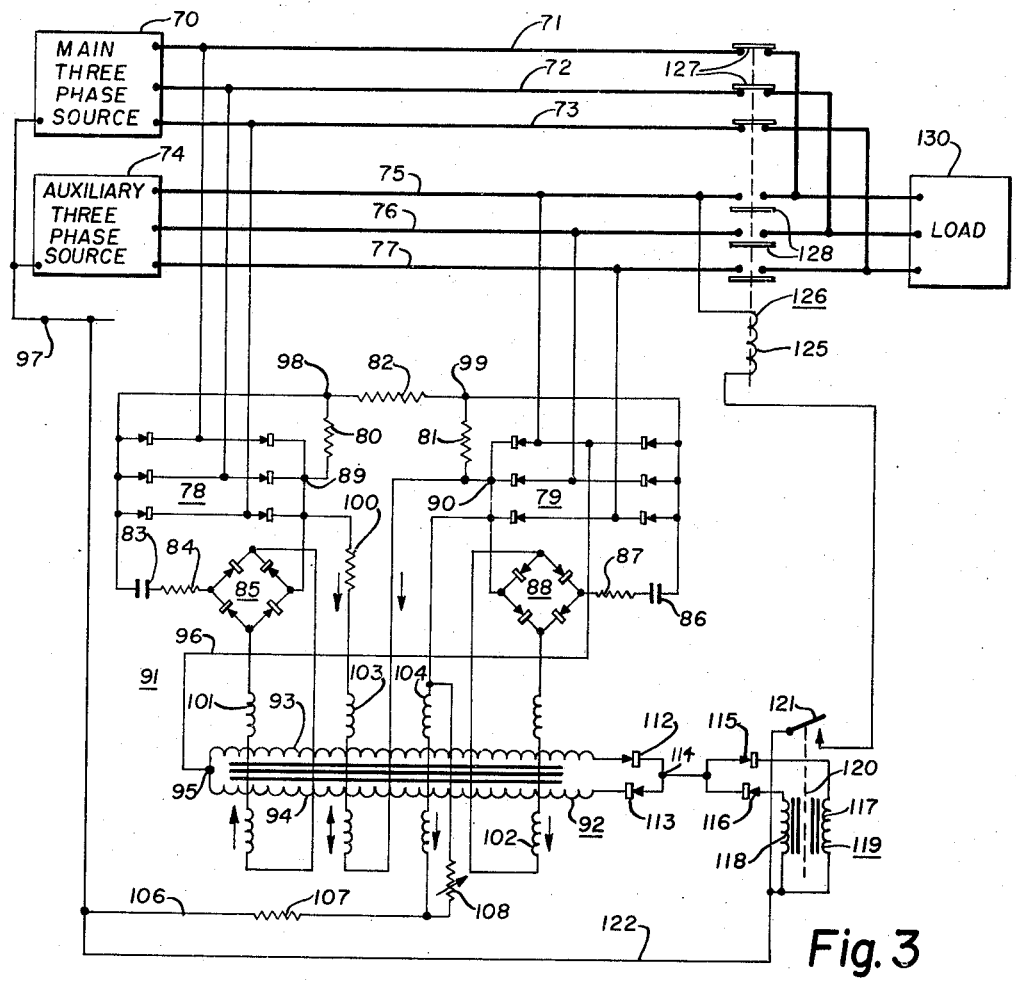
Figure 3 is a schematic diagram of a still further control circuit used for transfer switching.

The circuit of Figure 3 shows a transfer switching arrangement and is a preferred embodiment of the invention. A normal or main three-phase source 70 illustrative of a polyphase source supplies main conductors or bus bars 71, 72, and 73. An auxiliary three-phase source 74 supplies conductors or bus bars 75, 76, and 77. A full-wave rectifier 78 is supplied from the conductors 71, 72, and 73, and another full-wave rectifier 79 is supplied from the conductors 75, 76, and 77. A load resistor 80 is connected across the output of the full-wave rectifier 78 and similarly a load resistor 81 is connected across the output of the rectifier 79. A resistor 82 interconnects terminals 98 and 99 of each of the rectifiers 78 and 79. The alternating current voltage component of the load resistor 80 is passed by a ripple condenser 83 and a resistor 84 to a bridge rectifier 85. Similarly, the alternating current voltage component of the resistor 81 is passed by a ripple condenser 86 and a resistor 87 to a bridge rectifier 88.

The rectifiers 78, 79, 85, and 88 are part of the control circuit 91 which includes a magnetic amplifier 92. This magnetic amplifier has gate windings 93 and 94 connected together at a terminal 95. The terminal 95 is connected by a conductor 96 to bus bar 75. The magnetic amplifier 92 includes a plurality of control windings. A control winding 101 is connected to the output of the bridge rectifier 85. A similar control winding 102 is connected to the output of the bridge rectifier 88. A control winding 103 is connected in series with a resistor 100 and connected between terminal 89 of the rectifier 78 and terminal 90 of the rectifier 79. The control winding 104 is a bias winding and is connected between the terminal 90 and a neutral 97 by a conductor 106 and current limiting resistor 107. The neutral 97 is a neutral for both of the normal and auxiliary sources 70 and 74. A rheostat 108 is connected in parallel with the winding 104 for adjusting the bias voltage. This method of obtaining a bias or reference voltage is only illustrative, and it will be seen that such bias voltage could be obtained from any direct current source, even a battery, and one which preferably is independent of the main voltage source 70.

The magnetic amplifier 92 includes rectifiers 112 and 113 connected in series with the gate windings 93 and 94. The other terminals of the rectifiers 112 and 113 are interconnected at a terminal 114, and rectifiers 115 and 116 are connected from this terminal 114 to relay coils 117 and 118, respectively, of a control relay 119. This control relay 119 has an armature 120 to control movement of normally open contacts 121. One end of the relay coils 117 and 118 is interconnected and connected by a conductor 122 to the neutral 97, and the contacts 121 are also connected between this conductor 122 and a relay coil 125 of a power relay 126. The other end of the relay coil 125 is connected to the bus bar 75. The power relay 126 controls normally closed contacts 127 and normally open contacts 128 with the contacts 127 normally connecting a polyphase load 130 to the main bus bars 71—73 and the contacts 128 connected for alternatively connecting the load 130 to the auxiliary bus bars 75—77.

*Operation of Figure 3*

The rectifiers 78 and 79 obtain a full-wave rectified voltage from the main and auxiliary voltage sources, respectively, to develop direct current voltages across the load resistors 80 and 81 which are proportional to positive sequence voltages. There necessarily is a small alternating current ripple voltage on these resistors 80 and 81 and these ripple voltages are passed by the ripple condensers 83 and 86 to the respective bridge rectifiers 85 and 88. Thus, the output voltages of the rectifiers 85 and 88 are proportional to the negative sequence voltages on the main and auxiliary bus bars, respectively. The control effect of the voltages proportional to the negative sequence voltages is produced by the control windings 101 and 102. The effect of the two positive sequence voltages is not produced by separate control windings, rather they are combined in opposition on the single control winding 103. This has been shown by the double headed arrow adjacent the control winding 103. The bias or reference voltage is applied to the control winding 104 and this voltage may be obtained from any suitable source and which in this case has been shown as being obtained from the auxiliary source 74 through a three-phase half-wave rectifier to neutral. By the arrows placed adjacent the control windings, which arrows are merely indicative of a relative direction, it will be seen that the bias winding 104 has its affect in a downward direction as does the control winding 102, whereas the control winding 101 has its effect in the upward direction.

The control windings 101 and 102 thus establish equal and opposite control effects. Also, the voltages from the load resistors 80 and 81 establish equal and opposite effects on the control winding 103. Actually, the control affect from the load resistor 80 is downward on the winding 103; and hence, from the main source 70 the effect of the positive and negative sequence control signals is opposed. Similarly, the positive and negative sequence control signals from the auxiliary source are in opposition.

If a balanced three-phase fault occurs on the main bus, this decreases the voltage on the load resistor 80 and decreases the positive sequence signal voltage supplied thereby to the control winding 103. With normal voltage on the auxiliary bus, this causes the net effect on control winding 103 to be in an upward direction. This is in opposition to the resultant established by the bias winding 104, hence, decreasing the total electromagnetic effect on the magnetic amplifier 92. This increases the unidirectional current through the gate windings 93 and 94 to energize the relay coils 117 and 118 sufficiently to close the control contacts 121. Since there is normal voltage on the auxiliary source 74, energy is supplied from the auxiliary conductor 75 to energize the power relay 126. This opens the contacts 127 and closes contacts 128 to effect a transfer of the load from the normal to the auxiliary source.

If an unbalanced fault occurs on the main bus 71—73 with normal voltage on the auxiliary bus 75—77, this unbalanced fault will cause a greatly increased ripple voltage to be passed by the ripple condenser 83 to the bridge rectifier 85. This gives a greatly increased negative sequence control signal to the control winding 101. As shown by the relative direction arrow, this electromagnetic effect is in opposition to the bias winding 104 to decrease the resultant and increase the magnetic amplified output to the control relay 119. Again this causes closing of the contacts 121 to energize the power relay 126 and thus effect a transfer of the load from the main to the auxiliary bus.

If either balanced or unbalanced faults occur on the auxiliary bus while the main bus maintains substantially normal voltage, this has no affect on the control or power relays 119 and 126. This is because these faults will increase the resultant electromagnetic effect supplied by the control windings to the magnetic amplifier; and thus, this would decrease the magnetic amplifier output to the control relay 119 so that the contacts 121 will not close. If, however, one of the two above described fault conditions has previously changed the load energization from the main to the auxiliary source and then some fault condition occurs on the auxiliary source which is a worse fault than that on the main bus, the control circuit 91 will effect a retransfer to the main bus. Assume one hundred units of voltage on each resistor 80 and 81 and sixty units of voltage on control winding 104, this gives one hundred minus one hundred plus sixty, or sixty units of voltage as a resultant for normal operation. Now if a balanced fault on the main bus 71—73 reduces the positive sequence voltage at resistor 80 from one hundred units to eighty units, the resultant control signal voltage will be eighty minus one hundred plus sixty, or in other words will have dropped from sixty units to forty units, and this will cause transfer of the load 130 from the main to the auxiliary bus. Now then, if a more severe balanced fault occurs on the auxiliary bus which drops the voltage at resistor 81 from one hundred units to fifty units, the resultant of all control voltages will be eighty units minus fifty units plus thirty units from the control winding to give a resultant of sixty units, which is back to approximately normal and thus re-transfer of the load to the main bus will be effected. Similarly, it will be seen that if the unbalanced fault on the auxiliary bus is greater than the unbalanced fault on the main bus, then the control effected by the control winding 102 will overpower the control effected by winding 101 and re-transfer to the main bus will be effected if transfer to the auxiliary bus had previously been made; or alternatively, the load will remain energized from the main bus. Also, if an unbalanced fault occurs on one bus and a balanced fault occurs on the other bus, then the load will be energized from that bus which has the least total fault so that the load is always energized from the best of the two voltage sources.

If an unbalanced fault occurs on the bus bar 75 of the auxiliary bus such that the voltage on this conductor 75 goes to zero, this unbalanced fault may be less severe than another fault on the main bus. In this case one would expect tansfer of the load 130 to the auxiliary bus. However, this cannot occur under these conditions because there is no voltage available to energize the power relay 126 and this is why the magnetic amplifier 92 has been energized from the same conductor 75 as energizes the power relay 126.

The magnetic amplifier has a built in time delay by utilizing control windings of many turns of wire. This provides an inductive time constant so that sudden changes of load, such as switching on and off portions of the load with accompanying transients, do not cause unnecessary transfer of the load to the auxiliary bus. This time delay may be as high as three to ten seconds and is very conveniently provided by the high inductance control windings in the magnetic amplifier. Similarly, the control circuits of Figures 1 and 2 are preferably provided with time delay means to prevent chattering of the contacts or unnecessary interruptions of energization of the load during transient conditions.

Figure 4:
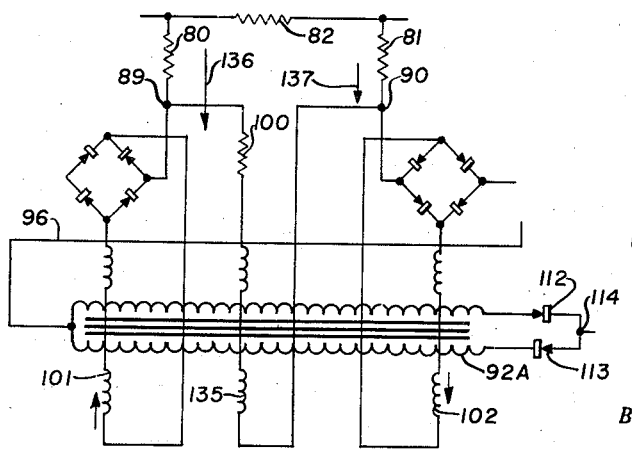
Figure 4 is a schematic diagram of a part of a circuit which may be substituted in the circuit of Figure 3.

Figure 4 shows a modified form of magnetic amplifier 92A which may be used in place of the magnetic amplifier 92 of Figure 3. The magnetic amplifier 92A has control windings 101 and 102 as before but has only a single extra control winding 135 which is connected between the rectifier terminals 89 and 90. In this circuit of Figure 4 there is no control winding such as control winding 104 of Figure 8 which provided a bias. In the circuit of Figure 4 the arrows 136 and 137 show the relative magnitude and relative direction of the control signal from the load resistors 80 and 81. It will be noted that the magnitude of the positive phase sequence voltage from the main bus, that is, from load resistor 80, is approximately twice as large as that of the auxiliary bus as derived across the load resistor 81. Thus, these voltages combined in opposition give a resultant which is directed downwardly, and thus this resultant is similar to the resultant electromagnetic effect in the circuit of Figure 3.

In operation the circuit of Figure 4 is quite similar to that previously described for Figure 3. For unbalanced faults on the main and auxiliary buses, control windings 101 and 102 will operate in the same way to effect control as in the circuit of Figure 3. For a balanced fault on the main bus, the control signal as indicated by the arrow 136 will decrease to decrease the resultant, thus increasing the magnetic amplifier output and effecting transfer of the load to the auxiliary bus. Also, if a balanced fault occurs on the auxiliary bus, the effect produced by the positive sequence voltage from resistor 81 decreases to increase the resultant electromagnetic effect and thus no transfer is effected, or alternatively, there is a retransfer to the main bus if a transfer has previously been made.

The circuit of Figure 1 shows amplifiers 20 and 29, and one or both of these may be replaced by attenuator means, and thus either the amplifiers or attenuators may be utilized to provide any desired ratio of strength of positive and negative sequence signal voltages. In the circuits of Figures 2, 3, and 4, the same result may be accomplished by varying the ampere turns ratio of the control windings or by trimming resistors in series or parallel with the control winding. This means that the negative sequence voltage signal, which normally is considerably smaller than the positive sequence voltage signal, since it is derived from the ripple voltage, can be made of the same order of magnitude for control purposes by increasing the number of turns on the appropriate control windings, such as windings 49, 101, and 102.

The circuit of Figure 1 also shows that the positive and negative sequence voltages may each be independently derived from separate polyphase rectifiers, and the circuits of Figures 2, 3, and 4 show an alternative circuit arrangement wherein both the positive and negative sequence voltages are derived from a single polyphase rectifier, which latter circuit is preferred for its economy and simplicity.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a monitoring system for a polyphase circuit, means for rectifying the voltage of said circuit to obtain a voltage having a direct and an alternating current component, means responsive only to the alternating current component and connected to said rectifier means, and means for controlling said circuit in accordance with the magnitude of voltage on said alternating current responsive means.

2. A polyphase circuit device, comprising, a positive sequence voltage sensing means operable from said circuit, negative sequence voltage sensing means operable from said circuit, contact means in said polyphase circuit, and relay means having first and second control inputs connected to said two sensing means, respectively, to control said contact means.

3. A polyphase circuit device, comprising, a positive sequence voltage sensing means operable from said circuit, said voltage sensing means having an output proportional to positive sequence voltage and a considerably smaller value of negative voltage, negative sequence voltage sensing means operable from the output of said positive sequence voltage sensing means, contact means in said polyphase circuit, and relay means having first and second control inputs connected to said two sensing means, respectively, to control said contact means.

4. A polyphase circuit control device, comprising, polyphase rectifier means operable from said circuit to obtain a rectified voltage at a value directly in accordance with the value of the voltage of said polyphase circuit, undervoltage sensing means connected to the output of said rectifier means, said rectifier means output voltage having a direct current component and having at least a small alternating current component, polyphase voltage unbalance sensing means, means responsive to said alternating current component for connecting said unbalance sensing means to said rectifier means output, contact means in said polyphase circuit, and relay means having first and second control inputs connected to said undervoltage and unbalance sensing means, respectively, to control said contact means.

5. A three-phase circuit protecting device, comprising, a three-phase rectifier operable from all three phases of said circuit to obtain a rectified voltage at a value directly in accordance with the value of the voltage on said three-phase circuit, undervoltage sensing means connected to the output of said rectifier, said rectifier output voltage having a direct current component and having at least a small alternating current component dependent in value on the amount of unbalance in the circuit, three-phase voltage unbalance sensing means, means responsive substantially only to said alternating current component for connecting said unbalance sensing means to said rectifier output, contact means in said three-phase circuit, and relay means including time delay means having first and second control inputs connected to said undervoltage and unbalance sensing means, respectively, to control said contact means.

6. In a polyphase electrical circuit having a polyphase load adapted to be energized from a polyphase source, the steps of, energizing said load from said source, obtaining from said source a first control voltage proportional in magnitude to said source voltage, obtaining a second control voltage proportional to the unbalance on said source, establishing a resultant electromagnetic effect from said control voltages, and maintaining the energization of said load from said source so long as said resultant does not decrease.

7. In a polyphase electrical circuit having a polyphase load adapted to be energized through a first set of contacts from a first polyphase source and alternatively energizable through a second set of contacts from a second polyphase source, the steps of, energizing said load from said first source through said first set of contacts, obtaining from said first source a first control voltage proportional in magnitude to said first source voltage, obtaining from said second source a second control voltage proportional in magnitude thereto, obtaining a bias voltage, obtaining a third control voltage proportional to the unbalance on said first source, obtaining a fourth control voltage proportional to the unbalance on said second source, establishing a resultant electromagnetic effect from said control and bias voltages, maintaining the energization of said load from said first source through said first set of contacts so long as said resultant does not decrease, and changing the energization of said load to said second source through said second set of contacts when said resultant decreases, as by some fault on said first source.

8. In a polyphase electrical circuit having a polyphase load adapted to be energized through a first set of contacts from a first polyphase source and alternatively energizable through a second set of contacts from a second polyphase source, the steps of, energizing said load from said first source through said first set of contacts, obtaining from said first source a first rectified voltage directly proportional in magnitude to said first source voltage, obtaining from said second source a second rectified voltage directly proportional in magnitude thereto, combining said first and second rectified voltages in opposition to obtain a first reversible control voltage which is normally zero in the absence of faults in said circuit, obtaining a second control voltage from said second source, obtaining a third rectified control voltage from said first rectified voltage proportional to the alternating current component thereof, obtaining a fourth rectified control voltage from said second rectified voltage proportional to the alternating current component thereof, establishing first, second, third and fourth electromagnetic effects from said first, second, third and fourth control voltages, respectively, subtracting said third electromagnetic effect from the additive combination of said second and fourth electromagnetic effects and combining same with said first electromagnetic effect to obtain a resultant, maintaining the energization of said load from said first source through said first set of contacts so long as said resultant does not decrease, and changing the energization of said load to said second source through said second set of contacts when said resultant decreases, as by some fault on said first source.

9. In a polyphase electrical circuit having a polyphase load adapted to be energized through a first set of contacts from a first polyphase source and alternatively energizable through a second set of contacts from a second polyphase source, the provision of, means for energizing said load from said first source through said first set of contacts, means for obtaining from said first source a first control voltage directly proportional in magnitude to said first source voltage, means for obtaining from said second source a second control voltage directly proportional in magnitude thereto, means for obtaining a bias reference voltage, means for obtaining a third control voltage from said first control voltage proportional to the alternating current component thereof, means for obtaining a fourth control voltage from said second control voltage proportional to the alternating current component thereof, means for establishing a resultant electromagnetic effect from said control and bias voltages with the effect of said first and second and of said third and fourth control voltages being in opposition and with said first and third control voltages and said second control and bias voltages being in opposition, means for maintaining the energization of said load from said first source through said first set of contacts so long as said resultant does not decrease, and changing the energization of said load to said second source through said second set of contacts when said resultant decreases, as by some fault on said first source.

10. In a polyphase electrical circuit having a polyphase load adapted to be energized through a first set of contacts from a first polyphase source and alternatively energizable through a second set of contacts from a second polyphase source, the provision of, means for energizing said load from said first source through said first set of contacts, means for obtaining from said first source a first rectified voltage directly proportional in magnitude to said first source voltage, means for obtaining from said second source a second rectified voltage directly proportional in magnitude thereto, means for combining said first and second rectified voltages in opposition to obtain a first reversible control voltage which is normally zero in the absence of faults in said circuit, means for obtaining a second control voltage from said second source, means for obtaining a third rectified control voltage from said first rectified voltage proportional to the alternating current component thereof, means for obtaining a fourth rectified control voltage from said second rectified voltage proportional to the alternating current component thereof, means for establishing first, second, third and fourth electromagnetic effects from said first, second, third and fourth control voltages, respectively, means for subtracting said third electromagnetic effect from the additive combination of said second and fourth electromagnetic effects and combining same with said first electromagnetic effect to obtain a resultant, means for maintaining the energization of said load from said first source through said first set of contacts as long as said resultant maintains at least a given value, and means for changing the energization of said load to said second source through said second set of contacts when said resultant decreases from said given value, as by some fault on said first source.

11. In a polyphase electrical circuit having a polyphase load adapted to be energized through a first set of contacts from a first polyphase source and alternatively energizable through a second set of contacts from a second polyphase source, the provision of, means for energizing said load from said first source through said first set of contacts, means for obtaining from said first source a first rectified voltage directly proportional in magnitude to said first source voltage, means for obtaining from said second source a second rectified voltage directly proportional in magnitude thereto, means for combining said first and second rectified voltages in opposition to obtain a first reversible control voltage which is normally zero in the absence of faults in said circuit, means for obtaining a second control voltage from said second source, means for obtaining a third rectified control voltage from said first rectified voltage proportional to the alternating current component thereof, means for obtaining a fourth rectified control voltage from said second rectified voltage proportional to the alternating current component thereof, means for establishing first, second, third and fourth electromagnetic effects from said first, second, third and fourth control voltages, respectively, means for combining said first and second electromagnetic effects with said second electromagnetic effect being in opposition to the effect established by said first rectified voltage, means for establishing said third and fourth electromagnetic effects in opposition with said third electromagnetic effect in opposition to said second electromagnetic effect, said first, second, third and fourth electromagnetic effects together establishing a resultant, means for maintaining the energization of said load from said first source through said first set of contacts as long as said resultant maintains at least a given value, and means for changing the energization of said load to said second source through said second set of contacts when said resultant decreases from said given value, as by some fault on said first source.

12. In a polyphase alternating current system for operating load circuit means from an alternating current power source through power switching means normally connecting said source to said load circuit means, said switching means being arranged and operable to disconnect said source from said load circuit means, the combination comprising, a polyphase rectifier connected to said source to be energized thereby, a direct current control coil connected as a load to the output of said rectifier, a condenser and second rectifier connected in series across said direct current control coil, said condenser passing only the ripple voltage across said direct current control coil to said second rectifier, a second direct current control coil connected as a load to the output of said second rectifier, contact means controlled by said first and second control coils and adapted to be maintained in a given condition by normal voltage on said source, and despite the normally small ripple voltage appearing across said first direct current control coil, and to be changed to a different condition by decreased voltage on said source and by appreciably larger values of ripple voltage as a consequence of line-to-ground and line-to-line unbalancing faults, and power relay means controlled by said contact means to operate said power switching means.

13. In a polyphase alternating current system including a normal alternating current power source, an alternate alternating current power source, load circuit means, and transfer switching means normally connecting said normal source to said load circuit means, said switching means being arranged and operable to disconnect said normal source from said load circuit means and connect said alternate source thereto, the combination comprising, a polyphase rectifier connected to said normal source to be energized thereby, a direct current control coil connected as a load to the output of said rectifier, a condenser and second rectifier connected in series across said direct current control coil, said condenser passing only the ripple voltage across said direct current control coil to said second rectifier, a second direct current control coil connected as a load to the output of said second rectifier, contact means controlled by said first and second control coils and adapted to be maintained in a given condition by normal voltage on said normal source, and despite the normally small ripple voltage appearing across said first direct current control coil, and to be changed to a different condition by decreased voltage on said normal source and by appreciably larger values of ripple voltage as a consequence of line-to-ground and line-to-line unbalancing faults, and power relay means controlled by said contact means to operate said transfer switching means.

14. In a polyphase alternating current system for operating load circuit means from an alternating current power source through power switching means normally connecting said source to said load circuit means in a first condition, said switching means being arranged and operable in a second condition to disconnect said source from said load circuit means, the combination comprising, a polyphase full-wave bridge rectifier connected to said source to be energized thereby, a first direct current control coil connected as a load to the output of said rectifier, a condenser and second full-wave bridge rectifier connected in series across said first direct current control coil, said condenser passing only the ripple voltage across said first direct current control coil to said second rectifier, a second direct current control coil connected as a load to the output of said second rectifier, contact means controlled by said first and second coils and adapted to be maintained in a given condition by normal voltage on said source, said contact means adapted to be maintained in said given condition despite the normally small ripple voltage appearing across said first direct current control coil and to be changed to a different condition by appreciably larger values of ripple voltage as a consequence of line-to-ground and line-to-line unbalancing faults, time delay means in said system and placed in operation by the said different condition of said contact means, and power relay means controlled by said different condition of said contact means to operate said power switching means from said first to said second condition.

15. In a polyphase alternating current system including a normal alternating current power source, an alternate alternating current power source, load circuit means, and transfer switching means normally connecting said normal source to said load circuit means in a first condition, said switching means being arranged and operable in a second condition to disconnect said normal source from said load circuit means and connect said alternate source thereto, the combination comprising, a polyphase rectifier connected to said normal source to be energized thereby, a first direct current control coil connected as a load to the output of said rectifier, a condenser and second full-wave bridge rectifier connected in series across said first direct current control coil, said condenser passing only the ripple voltage across said first direct current control coil to said second rectifier, a second direct current control coil connected as a load to the output of said second rectifier, contact means controlled by said first and second control coils and adapted to be maintained in a given condition by normal voltage on said normal source, said contact means adapted to be maintained in said given condition despite the normally small ripple voltage appearing across said first direct current control coil and to be changed to a different condition by appreciably larger values of ripple voltage as a consequence of line-to-ground and line-to-line unbalancing faults, time delay means in said system and placed in operation by the said different condition of said contact means, and power relay means controlled by said different condition of said contact means to operate said transfer switching means from said first to said second condition.

16. In a polyphase alternating current system including a normal alternating current power source, an alternate alternating current power source, load circuit means, and transfer switching means normally connecting said normal source to said load circuit means in a first condition, said switching means being arranged and operable in a second condition to disconnect said normal source from said load circuit means and connect said alternate source thereto, the combination comprising, first and second polyphase rectifiers connected to said normal and alternate sources, respectively, to be energized thereby, first and second direct current impedances connected as loads to the outputs of said first and second rectifiers, respectively, condensers and third and fourth full-wave bridge rectifiers connected, respectively, in series across said first and second direct current impedances, said condensers passing only the ripple voltage across the respective direct current impedances to the respective bridge rectifiers, third and fourth direct current impedances connected as loads to the outputs of said third and fourth rectifiers, respectively, normally open contact means controlled by said impedances and adapted to be maintained open so long as the sum of the voltages on said first and fourth impedances exceeds the sum of the voltages on said second and third impedances, and power means controlled by said contact means to operate said transfer switching means.

17. A polyphase circuit control device, comprising, polyphase rectifier means to obtain from said circuit a direct current voltage proportional to the positive sequence voltage of said circuit and an alternating current ripple voltage proportional to the negative sequence voltage of said circuit, undervoltage sensing means sensitive to the said direct current voltage, and unbalance sensing means responsive to said alternating current ripple voltage, relay means having first and second control inputs connected respectively to said undervoltage means and to said unbalance sensing means, said relay connected to control said circuit.

18. In a polyphase electrical circuit, means for rectifying the polyphase voltage of said electrical circuit to obtain a voltage having a direct and a periodic voltage component, means responsive only to the periodic voltage component and connected to the output of said rectifier means, and means for controlling said polyphase circuit in accordance with the magnitude of voltage on said periodic voltage responsive means.

19. A polyphase circuit device, comprising, positive sequence voltage sensing means including rectifier means operable from said circuit, negative sequence voltage sensing means including alternating current pass means operable from the output of said rectifier means, contact means in said polyphase circuit, and relay means having first and second control inputs connected to said two sensing means, respectively, to control said contact means.

20. A polyphase circuit control device, comprising, polyphase rectifier means operable from said circuit to obtain a rectified output voltage having at least a small alternating current component, polyphase voltage unbalance sensing means, means responsive to said alternating current component for connecting said unbalance sensing means to said rectifier means output, contact means in said polyphase circuit, and relay means having a control input connected to said unbalance sensing means to control said contact means.

21. In a polyphase electrical circuit wherein a source supplies a load, the steps of deriving a first electrical voltage proportional to the positive phase sequence voltages of said source, deriving a second electrical voltage proportional to the negative phase sequence voltages of said source, establishing an electromagnetic effect in accordance with each of said voltages, combining said electromagnetic effects in opposition to establish a resultant magnetomotive force, and controlling the energy supplied from said source to said load in accordance with said resultant magnetomotive force.

22. In a polyphase electrical circuit wherein a source supplies a load, the steps of deriving a first electrical voltage having a direct current component and proportional to the positive phase sequence voltages of said source, deriving a second electrical voltage having an alternating current component and proportional to the negative phase sequence voltages of said source, obtaining a direct current control voltage proportional to said alternating current component, establishing an electromagnetic effect in accordance with each said direct current component and voltage, combining said electromagnetic effects in opposition to establish a resultant magnetomotive force, and controlling the energy supplied from said source to said load in accordance with said resultant magnetomotive force.

References Cited in the file of this patent
UNITED STATES PATENTS

| | | |
|---|---|---|
| 1,806,351 | Jansson | May 19, 1931 |
| 2,121,594 | Harrison | June 21, 1938 |
| 2,323,485 | Pell | July 6, 1943 |